US010069820B2

United States Patent
Bradley et al.

(10) Patent No.: US 10,069,820 B2
(45) Date of Patent: Sep. 4, 2018

(54) LINKED REGISTRATION

(71) Applicant: Barclays Bank PLC, London, Greater London (GB)

(72) Inventors: Steven Bradley, London (GB); Conall O'Brien, Cheshire (GB); Jeremy Goldstone, Manchester (GB); Andrew Crichton, Cheshire (GB); James Sellwood, Surrey (GB); Anthony Ryan, London (GB)

(73) Assignee: Barclays Bank PLC, London (GB)

( * ) Notice: Subject to any disclaimer, the term of this patent is extended or adjusted under 35 U.S.C. 154(b) by 0 days.

(21) Appl. No.: 15/685,438

(22) Filed: Aug. 24, 2017

(65) Prior Publication Data

US 2017/0374054 A1 Dec. 28, 2017

Related U.S. Application Data

(63) Continuation of application No. 14/894,504, filed as application No. PCT/GB2014/051636 on May 29, 2014, now abandoned.

(30) Foreign Application Priority Data

May 29, 2013 (GB) .................................. 1309577.3

(51) Int. Cl.
*H04L 29/06* (2006.01)
*H04W 12/06* (2009.01)
(Continued)

(52) U.S. Cl.
CPC ............ *H04L 63/083* (2013.01); *G06F 21/42* (2013.01); *H04L 9/3213* (2013.01);
(Continued)

(58) Field of Classification Search
CPC ..... G06F 21/42; H04L 9/3213; H04L 9/3226; H04L 63/083; H04L 63/0807;
(Continued)

(56) References Cited

U.S. PATENT DOCUMENTS 6,005,942 A * 12/1999 Chan ..................... G06F 21/51
                                              235/379
8,417,771 B2 * 4/2013 Ferris ................. G06F 9/44526
                                              709/203
(Continued)

OTHER PUBLICATIONS

International Application No. PCT/GB2014/051636 International Filing Date: May 29, 2014 Notification of Transmittal of the International Search Report and the Written Opinion of the International Searching Authority or the Declaration. dated Aug. 8, 2014.
(Continued)

*Primary Examiner* — Mohammad A Siddiqi
(74) *Attorney, Agent, or Firm* — Morgan, Lewis & Bockius (57) ABSTRACT

Secure registration of a new application with a server system is provided. An old application has been registered with the system. A first link between the new application and the system establishes a first key and first check data is communicated from the system to the new application and passed to the old application. A second link between the old application and the system establishes a second key based on input of a credential to the old application; the first check data is communicated from the old application to the system. Enciphered second check data is communicated from the system to the old application over the second link and further encrypted by the old application using a third key. This generates doubly-enciphered check data which is passed to the new application and decrypted using the first key and a fourth key, generated at the new application based on the first check data and input of the credential to the new application.

23 Claims, 2 Drawing Sheets

(51) Int. Cl.
    *G06F 21/42* (2013.01)
    *H04L 9/32* (2006.01)
    *H04W 4/00* (2018.01)
    *H04W 4/50* (2018.01)

(52) U.S. Cl.
    CPC ........ *H04L 9/3226* (2013.01); *H04L 63/0807* (2013.01); *H04W 12/06* (2013.01); *H04L 63/067* (2013.01); *H04L 63/0838* (2013.01); *H04L 2463/061* (2013.01); *H04W 4/001* (2013.01); *H04W 4/50* (2018.02)

(58) Field of Classification Search
    CPC ............... H04L 63/067; H04L 63/0838; H04L 2463/061; H04W 12/06; H04W 4/001
    See application file for complete search history.

(56) References Cited

U.S. PATENT DOCUMENTS

| | | | | |
|---|---|---|---|---|
| 9,483,249 | B2* | 11/2016 | Khan | G06F 8/65 |
| 2003/0204726 | A1 | 10/2003 | Kefford et al. | |
| 2011/0225637 | A1 | 9/2011 | Counterman | |
| 2011/0265180 | A1* | 10/2011 | Unagami | G06F 11/3048 726/22 |
| 2012/0239936 | A1 | 9/2012 | Holtmanns et al. | |
| 2013/0132717 | A1* | 5/2013 | Brand | H04L 9/0825 713/156 |
| 2013/0227658 | A1 | 8/2013 | Leicher et al. | |
| 2014/0317408 | A1* | 10/2014 | Runcie | H04L 9/0819 713/171 |
| 2015/0193222 | A1* | 7/2015 | Pirzadeh | G06F 8/65 717/168 |
| 2015/0193224 | A1* | 7/2015 | Ziat | G06F 8/65 717/172 |

OTHER PUBLICATIONS

SAML (Security Assertion Markup Language) 2.0 Use Case (Accessed Nov. 25, 2013 and archived Wikipedia page dated as of Nov. 2011).

Anderson, Security Engineering Edition 2, published 2008, Wiley (accessed Nov. 25, 2013) including Chapter 3, Protocols, p. 63-92.

International Application GB1309577.3 Search Report under Section 17(5) Intellectual Property Office date of Search Nov. 28, 2013.

\* cited by examiner

FIG. 2

LINKED REGISTRATION

CROSS REFERENCE TO RELATED APPLICATIONS

This application is a continuation of U.S. patent application Ser. No. 14/894,504 filed on Nov. 28, 2015, entitled "LINKED REGISTRATION" which is a 371 National Stage of PCT/GB2014/051636 filed on May 29, 2014, which claims priority to Great Britain Application No. 1309577.3 filed May 29, 2013, all of which are incorporated herein by reference in their entireties.

TECHNICAL FIELD OF THE INVENTION

The invention concerns a method, an electronic system and a server system, for secure registration of a new application operating on an electronic user system with the server system. In particular, an old application operating on the same electronic user system is already securely registered with the server system by reference to a user-specific credential.

BACKGROUND TO THE INVENTION

Secure electronic communication is important for many types of application. The operator of a remote server may agree at least one unique credential with a user, which the user then uses to provide inputs to an application operating on a local electronic device. These can then be used to authenticate and register the user and the application with the remote server, thereby confirming that the user's identity. This registration then allows them to use the application for further secure communication with the server, so that the server can provide a secure service, such as banking. The registration process captures information about the user, thus allowing any existing user records to be identified and identity checks to be performed. Eligibility for the use of the application can be determined and authentication credentials established for the service's ongoing use. This secure registration is a particular difficulty when the electronic device is portable, such as a smartphone or tablet.

Typically, the user is provided with a credential (such as a password or passcode) by the server operator. When the user first launches an application operating on their electronic device for communicating with the server, a registration process confirms that the registration credential is correct in a secure way. The credential itself may not be communicated between the electronic device and the server directly.

Once this initial process is complete, the user can then provide further details via a secure link as part of the registration, which can be complex and time-intensive. This part of registration process involves capturing data from the user. This is seen by some to be a laborious task on a portable device due to device's more limited data input, display size and connectivity when compared to personal computers.

In certain circumstances, the user may wish to use a second application on the same electronic device, in which the second application is also designed to communicate with a server so as to provide another secure service. To save time and avoid duplication of effort, it is advantageous that the user is able to make use of the existing registration in respect of the first application, when registering the second application. Moreover, it would be beneficial for the same credential to be used for authentication in respect of both applications. For example, this may be especially useful when the two applications are used to provide services from the same operator (although it is not necessary for them to access the same server).

However, this presents a significant challenge. Information passed between the two applications represents a security risk. The server or servers should also be able to detect fraudulent activity. Achieving this remains is a difficult issue.

SUMMARY OF THE INVENTION

Against this background and in a first aspect, the present invention provides a method for secure registration of a new application operating on an electronic user system with a server system. An old application operating on the same electronic user system has already been securely registered with the server system by reference to a user-specific credential. The method comprises: initializing a first secure link between the new application and the server system and thereby establishing a first encryption key; communicating first check data from the server system to the new application over the first secure link, the first check data being passed from the new application to the old application; initializing a second secure link between the old application and the server system based on a second encryption key, the second encryption key being based on an input of the user-specific credential by the user to the old application; communicating the first check data from the old application to the server system over the second secure link; communicating enciphered second check data from the server system to the old application over the second secure link, the enciphered second check data being encrypted with the first encryption key, the enciphered second check data being further encrypted by the old application using a third encryption key to generate doubly-enciphered check data thereby, the doubly-enciphered check data being passed from the old application to the new application, wherein the third encryption key is derived from the first check data and the user-specific credential inputted to the old application; and communicating a decrypted version of the doubly-enciphered check data from the new application to the server system over a secure link between the new application and the server system, the decrypted version of the doubly-enciphered check data being generated at the new application by decrypting the doubly-enciphered check data using the first encryption key and a fourth encryption key, wherein the fourth encryption key is generated at the new application based on the first check data and an input of the user-specific credential by the user to the new application.

This method may achieve a number of objectives. In particular, it may allow authentication of the user and of the new application (also termed a Requesting application) by the old application (also termed a Referring application), before passing any secure information about the user to the new application. This then allows a statement to be passed from the old application with respect to the user's registration status. The new application can then also collect user data from the old application, to save the user entering this information manually.

The first secure link and the second secure link are used to confirm that the first check data can be securely passed from the new application to the old application. The first check data can simply comprise a referral identifier, which may be issued by the server system in order to track the process. Then, the second secure link and a further secure link (which may be the first secure link or an additional third secure link between the new application and the server system) are used to confirm that the second check data (which for security, may be one-time generated random data, called a nonce, or some other cryptographic token that is integrity-preserving and difficult to fabricate falsely) can be securely passed in an encrypted form from the old application to the new application and then successfully decrypted by the new application. Since part of the encryption used in relation to the second check data is based on the user-specific credential, this also confirms that the user has inputted the correct credential to the new application. This assists in confirming the authenticity of the new application. It will be appreciated that the decrypted version of the doubly-enciphered check data is now singly-encrypted with only the first encryption key. The encryption based on the third encryption key is removed at the new application. There may be the potential for Time-Of-Check-To-Time-Of-Use (TOCTTOU) issues to arise if the old application does not link an authenticated request by the new application back to a recent authenticated approval by the customer.

Preferably, the method further comprises: comparing, at the server system, the first check data communicated from the old application against the first check data communicated to the new application. Additionally or alternatively, the method may further comprise: comparing, at the server system, the second check data communicated from the new application against the second check data communicated (in encrypted form) to the old application. Then, the method preferably further comprises completing a registration for the new application in response to a matching result of the step of comparing the first check data or to a matching result of the step of comparing the second check data and most preferably both. By a matching result, it may be understood that the two data items that are compared are the same (that is, identical).

The step of completing a registration for the new application may comprise passing information specific to the user stored in respect of the old application to the new application. Additionally or alternatively, it may comprise storing information about the user at the server system.

In the preferred embodiment, the electronic user system comprises an electronic device having an associated unique device identifier. The server system may store the unique device identifier in association with the registration for the old application. Then, the method optionally further comprises: communicating the unique device identifier from the new application to the server system; and comparing, at the server system, the unique device identifier communicated from the new application against the unique device identifier stored in association with the registration for the old application. The step of completing the registration for the new application may then be performed in response to a matching result of the step of comparing the unique device identifier.

The method advantageously further comprises: initializing a timer at the server system when the enciphered second check data is communicated from the server system to the old application; checking the value of the timer at the server system when the decrypted version of the doubly-enciphered check data is communicated from the new application to the server system; and comparing the checked value of the timer against a predetermined expiry time. Beneficially, the step of completing the registration for the new application is in response to a result of the step of comparing the checked value of the timer against the predetermined expiry time. Thus, the timer can be used to provide a lifetime for the second check data. This may assist in mitigating problems due to Time-Of-Check-To-Time-Of-Use (TOCTTOU) issues.

Optionally, the method further comprises: maintaining a retry counter at the server system. The retry counter may be incremented in response to a non-matching result of the step of comparing the first check data and/or in response to a non-matching result of the step of comparing the second check data and/or in response to a non-matching result of the step of comparing the unique device identifier and/or in response to a non-matching result of the step of comparing the checked value of the timer. Then, the method may further comprise terminating the secure registration of the new application if the retry counter meets a predetermined threshold. This avoids repeated failed attempts at registration, which may be indicative of a brute force attack.

In the preferred embodiment, the method further comprises storing the first encryption key and first check data on the electronic user system. Beneficially, the method further comprises triggering the operation of the old application at the electronic user system. Then, the steps of storing and/or triggering may be performed by the new application in response to the step of communicating the first check data from the server system to the new application. Optionally, the method further comprises receiving the user-specific credential from the user at the old application, subsequent to the step of triggering the operation of the old application.

Optionally, the step of communicating a decrypted version of the doubly-enciphered check data from the new application to the server system may be over the first secure link. In embodiments, the method further comprises storing the first encryption key and first check data at the server system and disabling the first secure link, in response to the step of communicating the first check data from the server system to the new application. In the preferred embodiment, the method further comprises initializing a third secure link between the new application and the server system. Then, the step of communicating a decrypted version of the doubly-enciphered check data from the new application to the server system may be over the third secure link instead of the first secure link.

Embodiments of the method may further comprise triggering the operation of the new application at the electronic user system by the old application, in response to the step of communicating the enciphered second check data from the server system to the old application, thereby passing the doubly-enciphered check data from the old application to the new application. Optionally, the method further comprises receiving the user-specific credential from the user at the new application.

The server system may comprise a single server, configured to communicate with both the new application and the old application. However in some embodiments, the server system comprises a first gateway server and a second gateway server. Then, the first secure link may be between the new application and the first gateway server. The second secure link may be between the old application and the second gateway server. The secure link used for communicating the decrypted version of the doubly-enciphered check data may be between the new application and the first gateway server. In this way, the first gateway server may be configured to communicate with the new application and the second gateway server may be configured to communicate with the old application.

In such configurations, further communication between the gateway servers may be implemented. For example, the step of communicating first check data from the server system to the new application may comprise communicating the first check data from the first gateway server to the new application. The step of communicating the first check data from the old application to the server system over the second secure link may comprise communicating the first check data from the old application to the second gateway server over the second secure link. Then, the method may further comprise: initializing a first secure inter-server link between the first gateway server and the second gateway server. Advantageously, the method further comprises communicating the first check data and the first encryption key from the first gateway server to the second gateway server over the first secure inter-server link. Thus, the second gateway server acts to generate the first check data and to confirm that the first check data received via the old application matches the generated version of the first check data.

In some embodiments, the steps of initializing the second secure link and communicating the first check data from the old application to the second gateway server take place during a first time period. Then, the steps of initializing the first secure inter-server link and communicating the first check data and the first encryption key from the first gateway server to the second gateway server may take place during a second time period. Preferably, the first and second time periods at least partially overlap. More preferably, the first and second time periods substantially overlap (at least 50% overlap or at least 60% overlap or at least 70% overlap or at least 75% overlap or at least 80% overlap or at least 90% overlap or at least 95% overlap or at least 99% overlap). In some embodiments, the first and second time periods completely overlap. It should be noted that the first and second time periods need not be the same length though.

Beneficially, the step of communicating the second check data from the server system to the old application comprises communicating the enciphered second check data from the second gateway server to the old application over the second secure link. Then, the step of communicating the decrypted version of the doubly-enciphered check data from the new application to the server system may comprise communicating the decrypted version of the doubly-enciphered check data from the new application to the first gateway server over a secure link. The method optionally further comprises: initializing a second secure inter-server link between the first gateway server and the second gateway server. Advantageously, the method further comprises: communicating the second check data from the first gateway server to the second gateway server over a secure inter-server link, which is beneficially the second secure inter-server link. Hence, the second gateway server may act to generate the second check data (such as a nonce) and to confirm that the second check data received via the new application matches the generated version of the second check data. This may help to confirm that the credential inputted to the new application matches that inputted to the old application and that the secure passing of key information is correct.

In some embodiments, the first gateway server has an associated unique gateway identity. Then, the step of communicating the first check data and the first encryption key from the first gateway server to the second gateway server may further comprise communicating the unique gateway identity of the first gateway server over the first secure inter-server link. Optionally, the step of communicating the second check data from the first gateway server to the second gateway server further comprises communicating the unique gateway identity of the first gateway server over a secure inter-server link, which is beneficially the second secure inter-server link. Advantageously, the method further comprises comparing the unique gateway identity communicated over the second secure inter-server link against the unique gateway identity communicated over the first secure inter-server link. This may act as a further check to confirm that communication between the server system to the electronic user system and between the old application and the new application within the electronic user system is secure.

In embodiments, the electronic user system comprises an electronic device, which may further have an associated unique device identifier. Then, the method may further comprise storing the unique device identifier at the server system (optionally, the second gateway server) in association with the old application. The method beneficially further comprises: communicating the unique device identifier from the new application to the server system over the first secure link. The unique device identifier communicated from the new application to the server system may then be compared against the unique device identifier stored at the server system in association with the old application. Where the server system comprises first and second gateway servers, as discussed above, the method optionally further comprises: communicating the unique device identifier communicated from the new application to the first gateway server from the first gateway server to the second gateway server over the first secure inter-server link. The step of comparing the unique device identifier may then take place at the second gateway server. This may act as a further security measure to prevent fraud.

In many embodiments, the electronic user system comprises an electronic device, preferably only one electronic device. Then, the old application and the new application may both operate on the electronic device (that is, on the same electronic device). In other embodiments, the electronic user system comprises a first electronic device and a second electronic device, the old application operating on the first electronic device and the new application operating on the second electronic device.

It will be appreciated that the present invention may also be found in one or more computer programs or program logic configured when operated by programmable logic to carry out any of the method steps as described herein when operated by a processor.

In a further aspect, the present invention may provide an electronic system for secure application registration, comprising: an electronic user system, configured to operate an old application and a new application; and a server system, the old application operating on the electronic user system being already securely registered with the server system by reference to a user-specific credential. The electronic system is configured to register the new application securely with the server system by: initializing a first secure link between the new application and the server system and thereby establishing a first encryption key; communicating first check data from the server system to the new application over the first secure link, the first check data being passed from the new application to the old application; initializing a second secure link between the old application and the server system based on a second encryption key, the second encryption key being based on an input of the user-specific credential by the user to the old application; communicating the first check data from the old application to the server system over the second secure link; communicating enciphered second check data from the server system to the old application over the second secure link, the enciphered second check data being encrypted with the first encryption key, the enciphered second check data being further encrypted by the old application using a third encryption key to generate doubly-enciphered check data thereby, the doubly-enciphered check data being passed from the old application to the new application, wherein the third encryption key is derived from the first check data and the user-specific credential inputted to the old application; and communicating a decrypted version of the doubly-enciphered check data from the new application to the server system over a secure link between the new application and the server system, the decrypted version of the doubly-enciphered check data being generated at the new application by decrypting the doubly-enciphered check data using the first encryption key and a fourth encryption key, wherein the fourth encryption key is generated at the new application based on the first check data and an input of the user-specific credential by the user to the new application.

It will be understood that any of the features described above in connection with the first aspect of the invention may advantageously be provided in respect of this further aspect as part of the electronic system.

In a another aspect, there is provided a server system for secure registration of a new application operating on a remote electronic user system. An old application operating on the same electronic user system has already been securely registered with the server system by reference to a user-specific credential. The server system comprises: a first communication interface, configured to initialise a first secure link between the new application and the server system and thereby establishing a first encryption key and to communicate first check data to the new application over the first secure link, so that the first check data may be passed from the new application to the old application; a second communication interface, configured to initialise a second secure link between the old application and the server system based on a second encryption key, the second encryption key being based on an input of the user-specific credential by the user to the old application, the second communication interface being further configured to receive the first check data from the old application over the second secure link; encryption logic, configured to generated enciphered second check data by encrypting second check data with the first encryption key, the second communication interface being further configured to communicate the enciphered second check data to the old application over the second secure link; a third communication interface, configured to receive a decrypted version of the second check data from the new application over a secure link between the new application and the server system.

Optionally, any of the method features described above in connection with the first aspect of the invention may advantageously be provided in respect of this aspect as part of the server system. Some specific features of the server system are worth noting explicitly though.

For instance, the server system may further comprise comparison logic, configured to compare the first check data received from the old application over the second secure link against the first check data communicated to the new application over the first secure link and to compare the decrypted version of the second check data received from the new application over the third secure link against the second check data communicated as enciphered second check data to the old application over the second secure link.

In the preferred embodiment, the server system further comprises registration logic, configured to complete the registration for the new application in response to the comparison logic determining that the first check data received from the old application over the second secure link is the same as the first check data communicated to the new application over the first secure link and that the decrypted version of the second check data received from the new application over the third secure link is the same as the second check data communicated as enciphered second check data to the old application over the second secure link.

Optionally, the server system further comprises: a first gateway server, comprising the first communication interface and the third communication interface; and a second gateway server, comprising the second communication interface. Then, the server system may further comprise: an inter-server communication interface, configured to initialise a first secure inter-server link between the first gateway server and the second gateway server and to communicate the first check data and the first encryption key from the first gateway server to the second gateway server over the first secure inter-server link. In some embodiments, the inter-server communication interface is further configured to initialise a second secure inter-server link between the first gateway server and the second gateway server and to communicate the second check data from the first gateway server to the second gateway server over the second secure inter-server link.

In embodiments, the first gateway server has an associated unique gateway identity. Then, the inter-server communication interface may be further configured to communicate the unique gateway identity of the first gateway server over the first secure inter-server link and to communicate the unique gateway identity of the first gateway server over the second secure inter-server link. Optionally, the server system further comprises comparison logic, configured to compare the unique gateway identity communicated over the second secure inter-server link against the unique gateway identity communicated over the first secure inter-server link. This comparison logic may be part of the comparison logic described above or it may be separate comparison logic (alternative comparison logic or additional comparison logic, such as second or further comparison logic).

Preferably, the third communication interface is further configured to initialise a third secure link between the new application and the server system, for instance by establishing a third encryption key. Then, the third communication interface may be configured to receive the decrypted version of the second check data from the new application over the third secure link. Alternatively, the third communication interface is part of the first communication interface. Then, the third communication interface may be configured to receive the decrypted version of the second check data from the new application over the first secure link.

A combination of any features from within one aspect or between aspects is also provided, even if not explicitly disclosed.

BRIEF DESCRIPTION OF THE DRAWINGS

The invention may be put into practice in various ways, one of which will now be described by way of example only and with reference to the accompanying drawings in which.

DETAILED DESCRIPTION OF A PREFERRED EMBODIMENT

Figure 1:
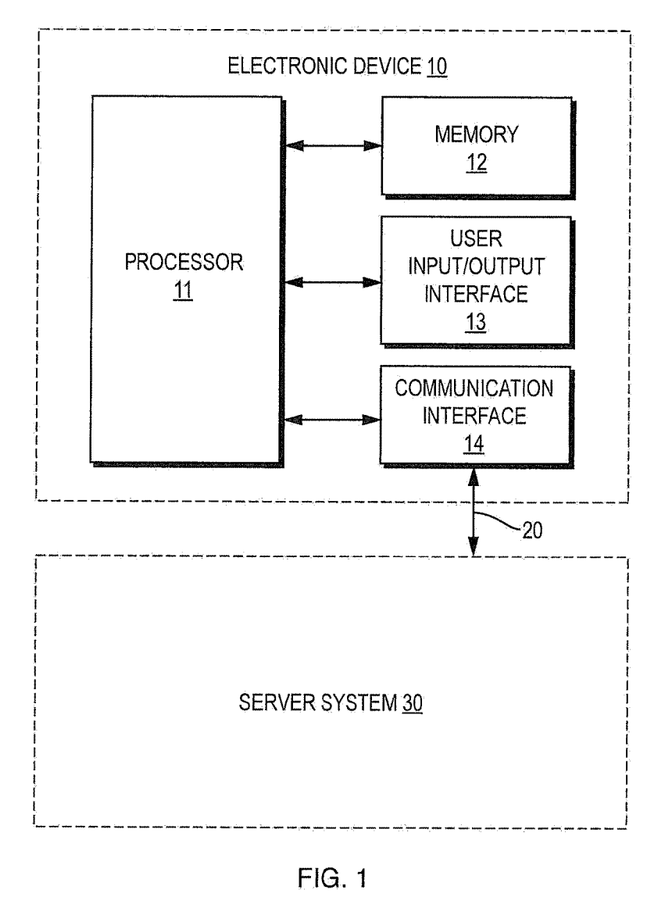
FIG. 1 shows a schematic diagram of the hardware components of a system for implementing an embodiment of the present invention.

Referring to FIG. 1, there is shown a schematic diagram of hardware components of a system for implementing an embodiment of the present invention. There are two main components: an electronic device 10 operated by a user (not shown); and a server system 30. The electronic device 10 and the server system 30 may communicate via a communications channel 20. In practice, the communications channel may comprise a series of communications channels over different communication links, which may include a one or more radio links and one or more non-wireless links. For instance, the electronic device 10 may be portable, such as a mobile telephone (smart phone), tablet computer or similar.

The electronic device 10 comprises: a processor 11; memory 12; user input/output interface 13; and communication interface 14. Each of the memory 12, user input/output interface 13 and communication interface 14 are configured to communicate with the processor 11. The communication interface 14 is configured to provide communication with the server system 30 via the communication channel 20. Especially where the electronic device 10 is portable, this may be a cellular radio interface, a wireless LAN interface or similar, for instance.

Figure 2:
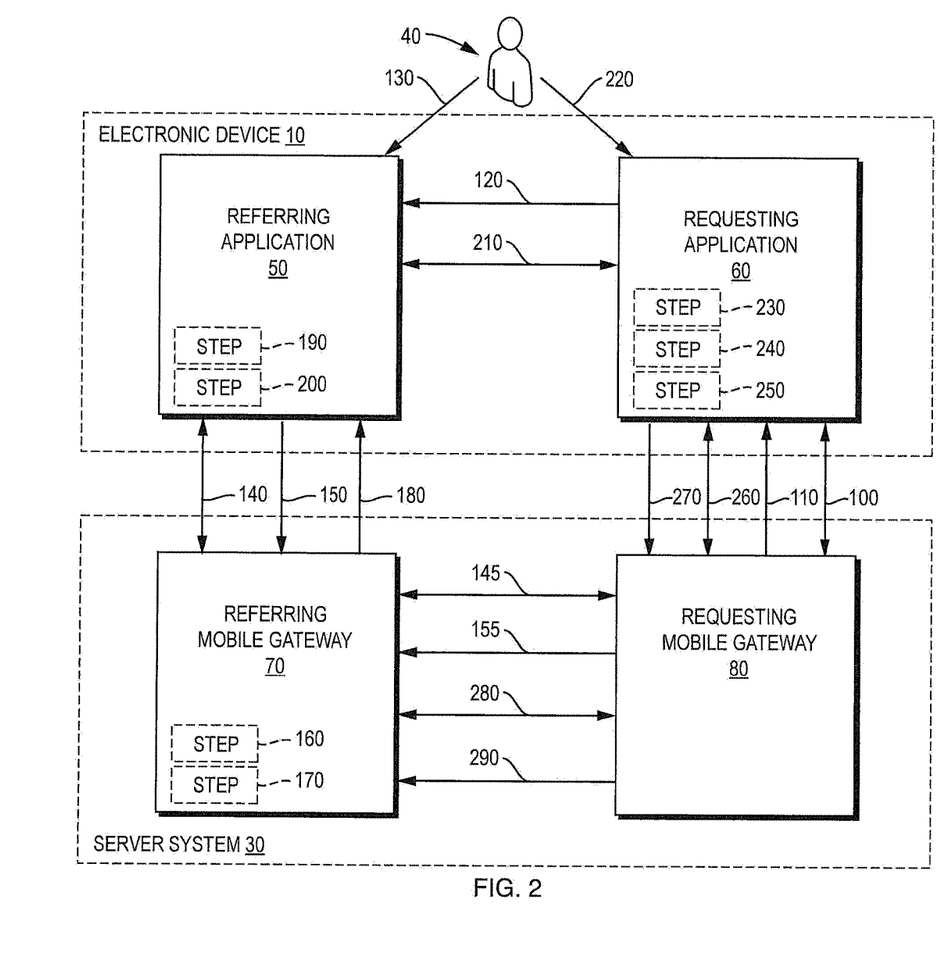
FIG. 2 schematically illustrates the functional components of a system for implementing an embodiment of the present invention together with the process steps carried out by each functional component according to this embodiment.

Referring next to FIG. 2, there is schematically illustrated functional components of a system for implementing an embodiment, together with the process steps carried out by each functional component according to this embodiment. As in FIG. 1, the components are divided into two main blocks: the electronic device 10; and the server system 30. Although the electronic device 10 is clearly a single device, the server system 30 may comprise multiple servers, which need not be co-located. Typically though, the multiple servers are commonly operated.

The main functional components of the electronic device 10 are: an old application 50, which is hereinafter referred to as a referring application; and a new application 60, which is hereinafter referred to as a requesting application. The referring application 50 and the requesting application 60 are applications operating on the processor 11 of the electronic device 10 and will be described in more detail below.

The main functional components of the server system 30 are: a first gateway server 70, hereinafter referred to as a referring mobile gateway; and a second gateway server 80, hereinafter referred to as a requesting mobile gateway.

The referring application 50 is already registered with the referring mobile gateway 70. A passcode has been assigned to the user 40 and this has been previously used to register details of the user as part of the referring application 50. These registration details have been stored at the server system 30 via the referring mobile gateway 70. Subsequently, the user 40 installs the new, requesting application 60 on the electronic device 10. Although the requesting application 60 is typically newly installed when the process of registration begins, this need not necessarily be so. It may be the case that the requesting application may be installed for some time before registration takes place.

The registration process which is now described allows the requesting application 60 to leverage the details stored in respect of the referring application 50 operating on the same electronic device 10 in a secure way. It should be noted that the user-specific passcode is not stored on electronic device 10 or in the server system 30 in this embodiment, although some embodiments may not include this restriction. Moreover, it cannot be passed between the referring application 50 and the requesting application 60. This helps to provide heightened security.

Upon launching the requesting application 60, it contacts the requesting mobile gateway 80 and performs the anonymous establishment of a key ($K_{REF}$), in step 100. Once this has been completed, the requesting mobile gateway 110 generates a referral ID. This referral ID is then stored at the requesting mobile gateway 80 together with the anonymous key ($K_{REF}$) generated in step 100. Also stored at this time is a device ID, which is a unique identifier for the electronic device 10. Then, in step 110, the requesting mobile gateway 80 communicates the referral ID to the requesting application 60 in the secure session established in step 100. Once this communication is completed, the secure session is torn down. The requesting app 60 temporarily stores the referral ID and the anonymous key, $K_{REF}$. This temporary storage may take place in the memory 12, with the requesting application 60 running in the background for a short period of time. It then triggers the referring app 50, passing to it the referral ID in step 120.

The referring application 50 then requests entry of the user-specific passcode from the user in step 130. This passcode is used to access or derive an application key.

Next, the referring application 50 completes an authentication process with the referring mobile gateway 70 using the application key derived in the previous step. A secure session is thereby established between the referring application 50 and the referring mobile gateway 70. Subsequently, the referring application 50 sends the referral ID to the referring mobile gateway 70 within the secure session, in step 150. The requesting mobile gateway 80 authenticates itself to the referring mobile gateway 70, in step 145. A secure session is thereby established between the requesting mobile gateway 80 and the referring mobile gateway 70. The requesting mobile gateway 80 sends the referring mobile gateway 70 the referring ID and $K_{REF}$ within the secure session established in step 145. This takes place in step 155. If a device ID is generated on the electronic device 10 and the requesting mobile gateway 80 wishes the referral to be bound to the device ID, then the device ID is also sent to the referring mobile gateway in this step. The referring mobile gateway 70 stores these details.

It will be understood that step 150 must take place subsequent to step 140. Similarly, step 155 must take place subsequently to step 145. However, steps 140 and 150 may take place in parallel with steps 145 and 155. There is no causal link between either of steps 140 and 150 on the one hand and either of steps 145 and 155 on the other.

The referring mobile gateway 70 then looks up the referral ID received from the referring application 50. If it has a record of device ID, it attempts to match this to its own recorded device ID (for the authenticated session established in step 140). If these checks are successful, then a nonce is generated and stored against the referral ID. This takes place in step 160. The nonce can simply be a randomly generated string of data, for one-time usage. The nonce is randomly produced from a suitable sized number space. If the checks are unsuccessful, then a nonce is generated but a check failure flag is stored against the referral ID, instead of the nonce value. The referring mobile gateway 70 stores an expiry time stamp and an identity for the requesting mobile gateway 80 with the referral ID and nonce.

In step 170, the referring mobile gateway 70 encrypts the nonce using the encryption key $K_{REF}$ established in step 100. This produces a nonce cipher (an encrypted version of the nonce). The referring mobile gateway 70 sends the nonce cipher to the referring application 50 within the secure session established in step 140. The referring application derives a passcode referral key ($K_{PASSREF}$) from the user's passcode entered in step 130 and the referral ID. This takes place in step 190. The referring application 50 then encrypts the nonce cipher using a passcode referral key ($K_{PASSREF}$), which is an encryption key based on the user-specific passcode and the referral ID to produce a personalised nonce cipher, in step 200.

The referring application 50 triggers the requesting application 60 and passes it the personalised nonce cipher in step 210. The requesting application 60 then requests passcode entry from the user in step 220. The requesting application 60 derives the passcode referral key ($K_{PASSREF}$) from the user's passcode entered in step 220 and the referral ID. This takes place in step 230.

Then, the requesting application 60 decrypts the personalised nonce cipher using the passcode referral key to produce the nonce cipher. This takes place in step 240. The requesting application 60 then decrypts the nonce cipher using $K_{REF}$ to produce a nonce, in step 250.

Now, the requesting application 60 contacts the requesting mobile gateway 80 and performs an anonymous key establishment process. This takes place in step 260. The requesting application 60 passes a device ID to the requesting mobile gateway 80 as part of this process. The requesting application 60 sends the requesting mobile gateway 80 the referral ID and the nonce that was recovered in step 250. This takes place within the secure session in step 270. The requesting mobile gateway 80 looks at the referral ID and uses this to find a device ID stored against it. It then checks the device ID that was communicated in step 260 against that stored and if the values do not match, the requesting mobile gateway 80 rejects the referral request from the requesting application 60 and increments a retry counter against the device ID.

The requesting mobile gateway 80 authenticates itself to the referring mobile gateway 70 in step 280. A secure session is thereby established between the requesting mobile gateway 80 and the referring mobile gateway 70. The requesting mobile gateway 80 then sends the referral ID and the nonce to the referring mobile gateway 70. The referring mobile gateway 70 looks up the referral ID and verifies that the nonce matches the values stored there. The referring mobile gateway also verifies that the expiry time has not yet been reached (based on the expiry time stamp that was established in step 160) and that the identity of the requesting mobile gateway 80 that submitted the nonce matches the identity of the mobile gateway that submitted $K_{REF}$ in step 155. If all the checks pass, then the referral is completed and the referring mobile gateway 70 may provide user information to the requesting mobile gateway 80 as determined by the same policies.

If any checks fail, the referral is rejected and a retry counter associated with the referral ID is incremented. The referral rejection will be transmitted to the requesting mobile gateway 80 and it should also increment a retry counter associated with the referral ID.

Although a specific embodiment has now been described, the skilled person will appreciate that variations and modifications are possible. For example, some of the features in this embodiment are optional, in particular, the use of a Device ID. Steps concerning this data may be omitted in variations of the embodiment. Similarly, aspects of the retry counter can also be varied or omitted as appropriate.

In one variation, it may be possible for the old (referring) application and new (requesting) applications to be operated using two different devices. Some communication interface may provide the link between the old and new applications. For example, a Bluetooth, Near Field Communication, optically-read code (such as a QR code) or other short-range communications technology could be used. This may provide the interface for passing the referral ID in step 120, passes the personalised nonce cipher in step 210 or similar.

It will be understood that the server system need not comprise a separate referring mobile gateway 70 and requesting mobile gateway 80. These may be combined and, in that case, steps 145, 155, 280 and 290 might be omitted as unnecessary. The specific data used in the referral ID and the nonce will also be recognised as open to variation. For example, other types of check data may be possible, especially those any equivalent code that is difficult or infeasible to pre-empt, guess or fabricate. Also, other types of encryption can be used from those discussed above.

Some of the steps of establishing a secure connection are also optional. For example, step 260 need not take place. Instead, the secure connection established in step 100 will continue to be used for the communication that takes place in step 270.

The invention claimed is:

1. A method for secure registration of a new application with a server system, the new application operating on an electronic user system wherein an old application operating on the same electronic user system has already been securely registered with the server system by reference to a user-specific credential, the method comprising:

initializing a first secure link between the new application and the server system and thereby establishing a first encryption key;

communicating first check data from the server system to the new application over the first secure link, the first check data being passed from the new application to the old application;

initializing a second secure link between the old application and the server system based on a second encryption key, the second encryption key being based on an input of the user-specific credential by the user to the old application;

communicating the first check data from the old application to the server system over the second secure link;

communicating enciphered second check data from the server system to the old application over the second secure link, the enciphered second check data being encrypted with the first encryption key, the enciphered second check data being further encrypted by the old application using a third encryption key to generate doubly-enciphered check data thereby, the doubly-enciphered check data being passed from the old application to the new application, wherein the third encryption key is derived from the first check data and the user-specific credential inputted to the old application; and communicating a decrypted version of the doubly-enciphered check data from the new application to the server system over a secure link between the new application and the server system, the decrypted version of the doubly-enciphered check data being generated at the new application by decrypting the doubly-enciphered check data using the first encryption key and a fourth encryption key, wherein the fourth encryption key is generated at the new application based on the first check data and an input of the user-specific credential by the user to the new application.

2. The method of claim 1, further comprising:
comparing, at the server system, the first check data communicated from the old application against the first check data communicated to the new application;
comparing, at the server system, the second check data communicated from the new application against the second check data communicated to the old application; and
completing a registration for the new application in response to a matching result of the step of comparing the first check data and to a matching result of the step of comparing the second check data.

3. The method of claim 2, wherein the electronic user system comprises an electronic device having an associated unique device identifier, the server system storing the unique device identifier in association with the registration for the old application, the method further comprising:
communicating the unique device identifier from the new application to the server system; and
comparing, at the server system, the unique device identifier communicated from the new application against the unique device identifier stored in association with the registration for the old application; and
wherein the step of completing the registration for the new application is in response to a matching result of the step of comparing the unique device identifier.

4. The method of claim 2, further comprising:
initializing a timer at the server system when the enciphered second check data is communicated from the server system to the old application;
checking the value of the timer at the server system when the decrypted version of the doubly-enciphered check data is communicated from the new application to the server system; and
comparing the checked value of the timer against a predetermined expiry time; and
wherein the step of completing the registration for the new application is in response to a result of the step of comparing the checked value of the timer against the predetermined expiry time.

5. The method of claim 2 further comprising:
maintaining a retry counter at the server system, the retry counter being incremented in response to a non-matching result of the step of comparing the first check data or in response to a non-matching result of the step of comparing the second check data or in response to a non-matching result of the step of comparing the unique device identifier or in response to a non-matching result of the step of comparing the checked value of the timer; and
terminating the secure registration of the new application if the retry counter meets a predetermined threshold.

6. The method of claim 1, further comprising:
storing the first encryption key and first check data on the electronic user system; and
triggering the operation of the old application at the electronic user system; and
wherein the steps of storing and triggering are performed by the new application in response to the step of communicating the first check data from the server system to the new application.

7. The method of claim 1, further comprising:
storing the first encryption key and first check data at the server system and disabling the first secure link, in response to the step of communicating the first check data from the server system to the new application.

8. The method of claim 1, further comprising:
initializing a third secure link between the new application and the server system; and
wherein the step of communicating a decrypted version of the doubly-enciphered check data from the new application to the server system is over the third secure link.

9. The method of claim 1, further comprising:
triggering the operation of the new application at the electronic user system by the old application, in response to the step of communicating the enciphered second check data from the server system to the old application, thereby passing the doubly-enciphered check data from the old application to the new application; and
receiving the user-specific credential from the user at the new application.

10. The method of claim 1, wherein the server system comprises a first gateway server and a second gateway server, the first secure link being between the new application and the first gateway server and the second secure link being between the old application and the second gateway server.

11. The method of claim 10, wherein the step of communicating first check data from the server system to the new application comprises communicating the first check data from the first gateway server to the new application and the step of communicating the first check data from the old application to the server system over the second secure link comprises communicating the first check data from the old application to the second gateway server over the second secure link, the method further comprising:
initializing a first secure inter-server link between the first gateway server and the second gateway server; and
communicating the first check data and the first encryption key from the first gateway server to the second gateway server over the first secure inter-server link.

12. The method of claim 10, wherein the step of communicating the second check data from the server system to the old application comprises communicating the enciphered second check data from the second gateway server to the old application over the second secure link and wherein the step of communicating the decrypted version of the doubly-enciphered check data from the new application to the server system comprises communicating the decrypted version of the doubly-enciphered check data from the new application to the first gateway server over a secure link between the new application and the server system, the method further comprising:
initializing a second secure inter-server link between the first gateway server and the second gateway server; and
communicating the second check data from the first gateway server to the second gateway server over the second secure inter-server link.

13. The method of claim 10, wherein:
the first gateway server has an associated unique gateway identity;
the step of communicating the first check data and the first encryption key from the first gateway server to the second gateway server further comprises communicating the unique gateway identity of the first gateway server over the first secure inter-server link;
the step of communicating the second check data from the first gateway server to the second gateway server further comprises communicating the unique gateway identity of the first gateway server over the second secure inter-server link; and the method further comprises comparing the unique gateway identity communicated over the second secure inter-server link against the unique gateway identity communicated over the first secure inter-server link.

14. The method of claim 1, wherein the electronic user system comprises an electronic device, the old application and the new application both operating on the electronic device.

15. An electronic system for secure application registration, comprising:
an electronic user system, configured to operate an old application and a new application; and
a server system, the old application operating on the electronic user system being already securely registered with the server system by reference to a user-specific credential; and
wherein the electronic system is configured to register the new application securely with the server system by:
initializing a first secure link between the new application and the server system and thereby establishing a first encryption key;
communicating first check data from the server system to the new application over the first secure link, the first check data being passed from the new application to the old application;
initializing a second secure link between the old application and the server system based on a second encryption key, the second encryption key being based on an input of the user-specific credential by the user to the old application;
communicating the first check data from the old application to the server system over the second secure link;
communicating enciphered second check data from the server system to the old application over the second secure link, the enciphered second check data being encrypted with the first encryption key, the enciphered second check data being further encrypted by the old application using a third encryption key to generate doubly-enciphered check data thereby, the doubly-enciphered check data being passed from the old application to the new application, wherein the third encryption key is derived from the first check data and the user-specific credential inputted to the old application; and
communicating a decrypted version of the doubly-enciphered check data from the new application to the server system over a secure link between the new application and the server system, the decrypted version of the doubly-enciphered check data being generated at the new application by decrypting the doubly-enciphered check data using the first encryption key and a fourth encryption key, wherein the fourth encryption key is generated at the new application based on the first check data and an input of the user-specific credential by the user to the new application.

16. A server system for secure registration of a new application operating on a remote electronic user system, wherein an old application operating on the same electronic user system has already been securely registered with the server system by reference to a user-specific credential, the server system comprising:
a first communication interface, configured to initialize a first secure link between the new application and the server system and thereby establishing a first encryption key and to communicate first check data to the new application over the first secure link, so that the first check data may be passed from the new application to the old application;
a second communication interface, configured to initialize a second secure link between the old application and the server system based on a second encryption key, the second encryption key being based on an input of the user-specific credential by the user to the old application, the second communication interface being further configured to receive the first check data from the old application over the second secure link;
encryption logic, configured to generated enciphered second check data by encrypting second check data with the first encryption key, the second communication interface being further configured to communicate the enciphered second check data to the old application over the second secure link;
a third communication interface, configured to receive a decrypted version of the second check data from the new application over a secure link between the new application and the server system.

17. The server system of claim 16, further comprising:
comparison logic, configured to compare the first check data received from the old application over the second secure link against the first check data communicated to the new application over the first secure link and to compare the decrypted version of the second check data received from the new application over the third secure link against the second check data communicated as enciphered second check data to the old application over the second secure link.

18. The server system of claim 17, further comprising:
registration logic, configured to complete the registration for the new application in response to the comparison logic determining that the first check data received from the old application over the second secure link is the same as the first check data communicated to the new application over the first secure link and that the decrypted version of the second check data received from the new application over the third secure link is the same as the second check data communicated as enciphered second check data to the old application over the second secure link.

19. The server system of claim 16, further comprising:
a first gateway server, comprising the first communication interface and the third communication interface; and
a second gateway server, comprising the second communication interface.

20. The server system of claim 19, further comprising:
an inter-server communication interface, configured to initialize a first secure inter-server link between the first gateway server and the second gateway server and to communicate the first check data and the first encryption key from the first gateway server to the second gateway server over the first secure inter-server link.

21. The server system of claim 20, wherein the inter-server communication interface is further configured to initialize a second secure inter-server link between the first gateway server and the second gateway server and to communicate the second check data from the first gateway server to the second gateway server over the second secure inter-server link.

22. The server system of claim 21, wherein:
the first gateway server has an associated unique gateway identity;
the inter-server communication interface is further configured to communicate the unique gateway identity of the first gateway server over the first secure inter-server link and to communicate the unique gateway identity of the first gateway server over the second secure inter-server link; and the server system further comprises comparison logic, configured to compare the unique gateway identity communicated over the second secure inter-server link against the unique gateway identity communicated over the first secure inter-server link.

23. The server system of claim 16, wherein the third communication interface is further configured to initialize a third secure link between the new application and the server system, by establishing a third encryption key and wherein the third communication interface is configured to receive the decrypted version of the second check data from the new application over the third secure link.

* * * * *